No. 749,635. PATENTED JAN. 12, 1904.
W. B. SHOTWELL.
WIRE STRETCHER.
APPLICATION FILED MAR. 20, 1903.
NO MODEL. 2 SHEETS—SHEET 1.

Witnesses
Inventor
William B. Shotwell.
By Victor J. Evans
Attorney

No. 749,635. PATENTED JAN. 12, 1904.
W. B. SHOTWELL.
WIRE STRETCHER.
APPLICATION FILED MAR. 20, 1903.
NO MODEL. 2 SHEETS—SHEET 2.
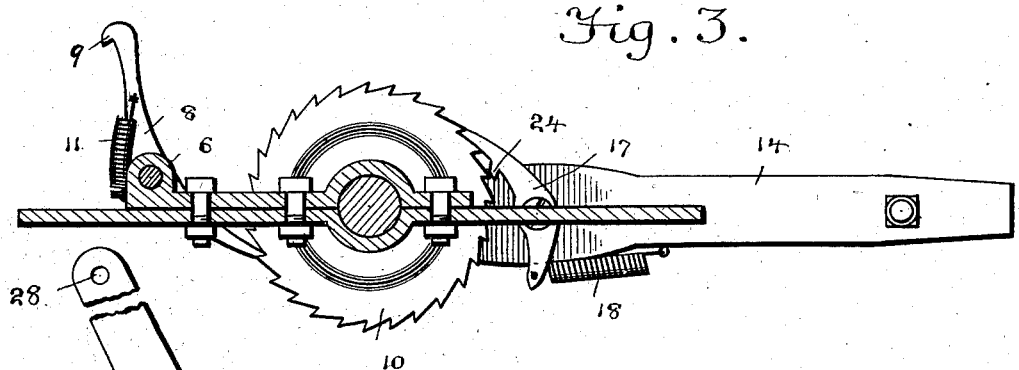
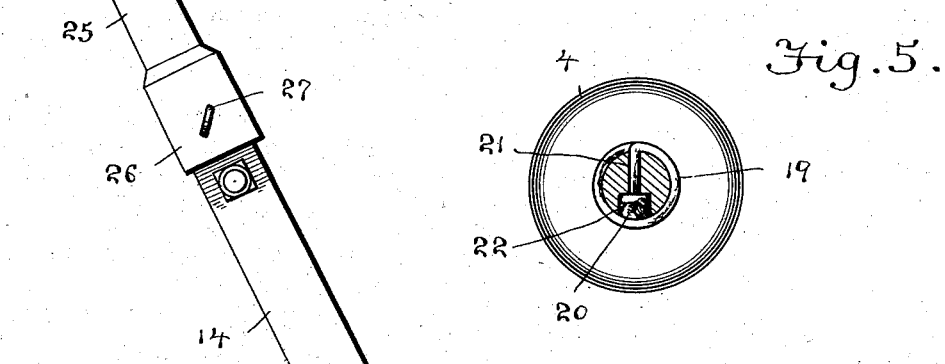
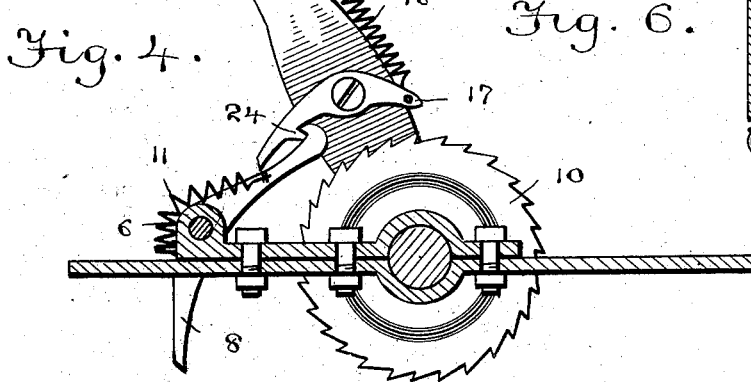
Witnesses
F. W. Riley
Herbert D. Lawson
Inventor
William B. Shotwell.
By Victor J. Evans
Attorney No. 749,635. Patented January 12, 1904.

UNITED STATES PATENT OFFICE.

WILLIAM B. SHOTWELL, OF IDLEWILD, KENTUCKY.

WIRE-STRETCHER.

SPECIFICATION forming part of Letters Patent No. 749,635, dated January 12, 1904.

Application filed March 20, 1903. Serial No. 148,805. (No model.)

*To all whom it may concern:*

Be it known that I, WILLIAM B. SHOTWELL, a citizen of the United States, residing at Idlewild, in the county of Boone and State of Kentucky, have invented new and useful Improvements in Wire-Stretchers, of which the following is a specification.

My invention relates to new and useful improvements in wire-stretchers; and its object is to provide a compact durable device by means of which a strand of wire may be quickly stretched until a desired tension has been obtained.

A further object is to provide pawl-and-ratchet mechanism of peculiar construction by means of which the spool of the device may be readily turned in one direction and which will automatically prevent the unwinding of said spool.

A further object is to so construct the pawls as to permit them to be locked out of contact with the ratchet when it is desired to unwind the spool.

With the above and other objects in view the invention consists in the novel construction and combination of parts hereinafter more fully described and claimed and illustrated in the accompanying drawings, showing the preferred form of my invention, and in which—

Figure 1:
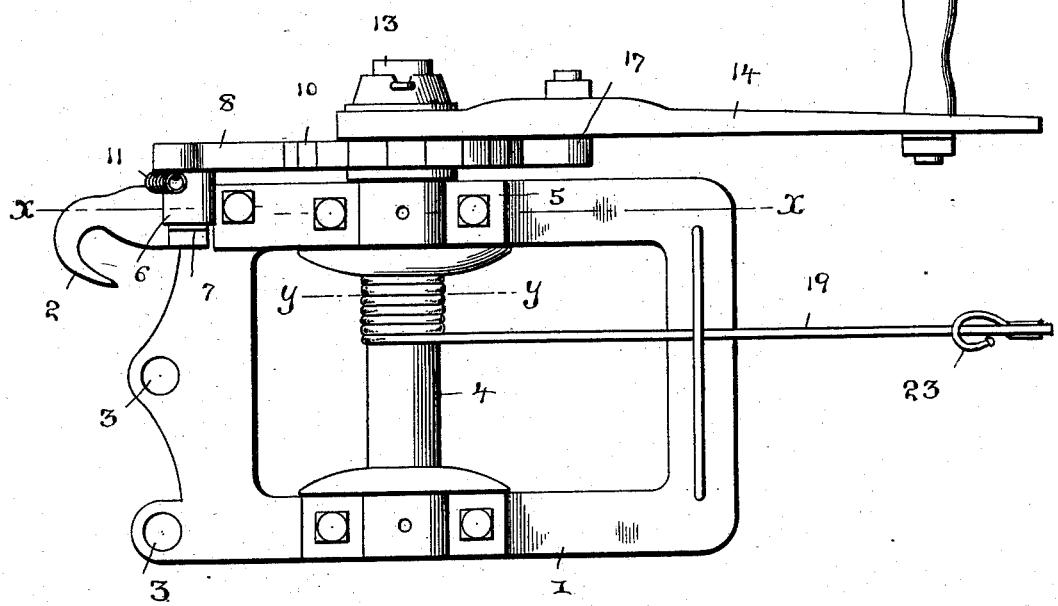
Figure 2:
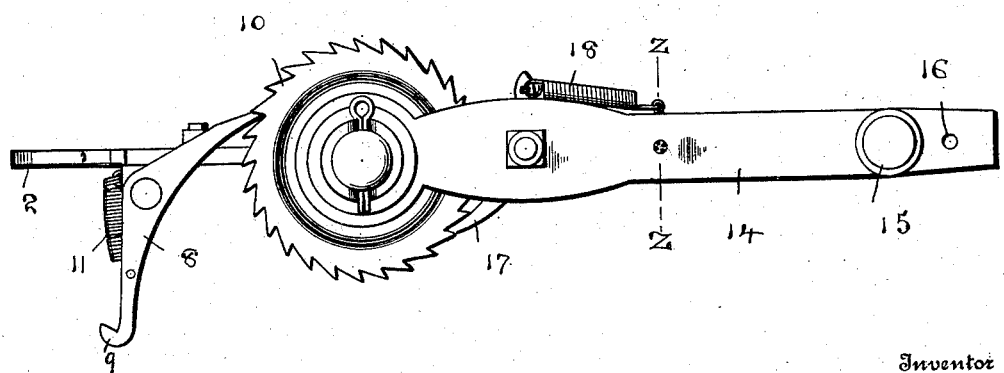

Figure 1 is a plan view of the wire-stretcher. Fig. 2 is a side elevation. Fig. 3 is a section on line $x\,x$ of Fig. 1. Fig. 4 is a similar view showing the pawls locked in position out of contact with the ratchet, the lever of the device being shown with an extension thereon. Fig. 5 is a section on line $y\,y$ of Fig. 1, and Fig. 6 is a section on line $z\,z$ of Fig. 2.

Referring to the figures by numerals of reference, 1 is a preferably rectangular frame having a hooked extension 2 at one side of one end thereof, and apertures 3 are also preferably formed within said end at its center and other side. A spool 4 is journaled upon the frame 1 and extends transversely thereof, and one of the bearing-plates 5 of the spool extends longitudinally of the frame and is provided with an ear 6, within which is journaled a lug 7, which extends laterally from the central portion of a pawl 8. One end of this pawl is provided with a hook 9, while the other end thereof is held normally in engagement with a ratchet-wheel 10 by means of a coiled spring 11, which is secured at opposite ends to the pawl and the frame 1, respectively. I preferably secure the spring to said pawl by means of a wire loop 12, which is inserted through an angular aperture therein, as illustrated in Fig. 6, the ends of the loop being spread apart to prevent the withdrawal thereof.

The ratchet-wheel 10 is secured to a shaft 13, which may be formed integral with spool 4 and extends laterally from frame 1. A lever 14 is loosely mounted upon the shaft 13, and this lever has a detachable handle 15 adjacent to one end thereof and an aperture 16, for the purpose hereinafter more fully described. Pivoted to the inner face of lever 14 is a pawl 17, one end of which is held normally in engagement with the ratchet-wheel 10 by means of a coiled spring 18, which connects the other end to the lever. This spring is secured to its pawl preferably in the same manner as is the spring 11, before referred to. By referring to Fig. 1 it will be seen that the two pawls and the ratchet-wheel are located in the same plane. A cable 19 of suitable length is secured to the spool 4, preferably at one end thereof, in any suitable manner. In Fig. 5 I have shown said spool provided with a recess 20, which communicates with a passage 21, extending transversely through the spool. The cable 19 is inserted through this passage and the knotted end 22 thereof arranged within recess 20.

When it is desired to stretch a wire by means of the device herein described, the strip 19 is placed about a suitably-arranged post, and the hook 23, which is preferably secured to the free end thereof, is employed for securing said strip to the post. The wire is then fastened to the hooked extension 2 and the shaft 13 and spool 4 rotated by means of the lever 14. It will be understood that when this lever is turned the pawl 17 thereon will rotate the ratchet-wheel 10 and spool 4, and said ratchet will be caused to move beneath the stationary pawl 8. The lever can be oscillated, and when pawl 17 is drawn over the teeth of the ratchet-wheel said ratchet-wheel will be prevented by pawl 8 from returning to its normal position and unwinding the strip 19. If desired, the lever can be rotated with the ratchet-wheel 10, and in such case pawl 17 will pass under the pawl 8 and automatically disengage the same from the ratchet-wheel. As soon as pawl 17 leaves the pawl 8 said pawl will be automatically returned to engagement with the ratchet of the spring 11. When it is desired to unwind the spool 4, the hooked end of pawl 8 is swung toward the ratchet-wheel, and pawl 17 is raised out of engagement with the ratchet-wheel. Lever 14 is then swung around a sufficient distance to bring the raised pawl 17 over the pawl 8, and a lug 24 on the pawl 17 will thus be moved into engagement with the hook 9. The two pawls will thus be locked out of contact with the ratchet-wheel 10, and the strip 19 will be free to unwind from spool 4. While the device is especially adapted for use in tightening wire, it is obvious that it can also be employed for hoisting purposes, for handling logs, &c. When it is desired to increase the leverage upon the spool 4, an attachment 25 may be employed. This attachment has an enlarged recessed head 26, which is adapted to fit over the end of lever 14, and a pin 27 is placed within the aperture 16 and serves to hold the attachment to said lever. When the extension 25 is used, handle 15 is removed and placed in an aperture 28, formed in the outer end of the extension.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a frame having a spool journaled therein, and a shaft extending from the spool; of a spring-pressed pawl pivoted upon the frame, a hook at one end of said pawl, a lever loosely mounted upon the shaft, a spring-pressed pawl pivoted thereon, a lug upon said pawl adapted to engage the hook on the other pawl, and a ratchet-wheel secured to the shaft and normally engaged by the pawls.

2. In a device of the character described, the combination with a frame having a spool journaled therein, and a shaft extending from the spool; of a bearing-plate for the shaft secured to the frame, an ear upon said plate, a pawl pivoted to the ear at one side thereof, a hook at one end of the pawl, a lever loosely mounted upon the shaft, a pawl pivoted thereto, a lug upon the pawl adapted to engage the hook on the other pawl, a ratchet-wheel secured to the shaft and springs for holding the pawls normally in engagement with the ratchet-wheel.

3. In a device of the character described, the combination with a frame having a hooked extension, a spool journaled upon the frame, and a shaft extending from the spool; of a ratchet-wheel secured to said shaft, a lever loosely mounted upon the shaft, an extension detachably secured to the lever, a pawl upon the lever, a lug thereon, a spring-pressed pawl pivoted upon the frame and normally engaging the ratchet-wheel, a hook upon the first-mentioned pawl adapted to engage the lug on the other pawl, whereby the pawls are held out of engagement with the ratchet-wheel, said pawls and wheel being arranged in the same plane, and a flexible strip connected to the spool and adapted to be wound thereon.

In testimony whereof I affix my signature in presence of two witnesses.

WILLIAM B. SHOTWELL.

Witnesses:
P. E. CASON,
B. W. ADAMS.